United States Patent Office 3,264,333
Patented August 2, 1966

3,264,333
6-KETO-Δ9(11)-DEHYDRO-ESTRADIOL AND DERIVATIVES THEREOF
Le Roy B. High, Cranbury, N.J., assignor, by mesne assignments, to E. R. Squibb & Sons, Inc., New York, N.Y., a corporation of Delaware
No Drawing. Filed Aug. 5, 1964, Ser. No. 387,780
2 Claims. (Cl. 260—397.45)

This invention relates to and has as its object the provision of new physiologically active steroids, processes for their preparation and novel intermediates useful in said preparation. More particularly, this invention relates to the production of compounds of the formula

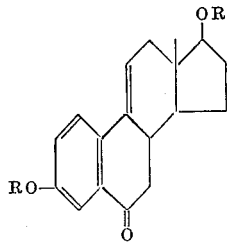

wherein each R is selected from the group consisting of hydrogen and acyl.

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenyl-propionic acid), the cycloalkane carboxylic acids and the cycloalkene carboxylic acids.

The compounds of this invention, in addition to being useful as intermediates in further chemical synthesis of steroids, have also been found to possess certain physiological activity. These compounds have been found to possess estrogenic activity and may be employed in place of such estrogens as estradiol in replacement therapy for estrogenic deficiency. The compounds of this invention may be administered parenterally, the dosage and/or concentration adjusted for the relative potency of the particular compound employed.

The compounds of this invention may be prepared by the processes of this invention beginning with the 3,17-diacyloxy derivative of estradiol as starting material. Included in the starting material are such compounds as estradiol diacetate, estradiol dipropionate, estradiol dibutyrate, estradiol dibenzoate and other like compounds. This starting material is oxidized by treatment with potassium permanganate to yield the respective 3,17-diacyloxy derivatives of Δ9(11)-6-keto-estradiol, the new products of this invention. These products may then be further reduced as by treatment with hydrogen in the presence of a palladium on charcoal catalyst to yield the 3,17-diacyloxy-6-keto-estradiol. The acyl constituents at the 3,17- position may be hydrolized as by treatment with an alkali metal base e.g., sodium or potassium hydroxide to yield the free 3,17-diol compounds. Likewise, this hydrolysis may be performed at any point in the process of this invention to yield the 3,17-diol compounds of this invention.

The invention may be further illustrated by the following examples:

EXAMPLE 1

*Estra-1,3,5(10),9(11)-tetrene-3,17β-diacetoxy-6-one*

Into 8.0 liters of acetone, refluxed and distilled from potassium permanganate, is dissolved 250 grams of estra-1,3,5(10)-triene-3,17β-diacetoxy. While stirring, add rapidly 300 grams of potassium permanganate dissolved in 1,500 cc. of water. The reaction becomes hot and gently refluxes for about one hour.

When the reaction subsides and the temperature returns to room temperature filter off the solid manganese dioxide and wash with acetone. Evaporate the acetone, in vacuo, yielding about 230 grams of a yellow oil.

To the above oily mixture add 2.5 liters of absolute ethanol, 250 cc. of glacial acetic acid, and 225 grams of Girard "T" reagent. This is refluxed for one hour and then evaporated to ⅓ volume in vacuo. The mixture is diluted with water and extracted with ethyl acetate. The aqueous solution is acidified to 1 N, with hydrochloric acid and stirred for two hours.

The solids are taken up in methylene chloride and the aqueous extracted with the same solvent. Evaporation of the methylene chloride solution yields crude estra-1,3,5(10),9(11)-tetrene-3,17β-diacetoxy-6-one.

The crude material is put onto 700 grams of acid washed alumina in cyclohexane:benzene (1:1) and eluted with the same mixture, 12 liters, yielding estra-1,3,5(10),9(11)-tetrene-3,17β-diacetoxy-6-one, which on recrystallization has a melting point of 161–162° C.

EXAMPLE 2

*Estra-1,3,5(10)-triene-3,17β-diacetoxy-6-one*

One gram of the material obtained in Example 1, when hydrogenated with palladium on charcoal, quantitatively yields the estra-1,3,5(10)-triene-3,17β-diacetoxy-6-one, M.P. 175–176° C.

EXAMPLE 3

*6-keto-estradiol*

One gram of 6-keto-estradiol diacetate is dissolved in 20 cc. of methanol to which is added 20 cc. of a 5% solution of KOH in methanol. After standing at room temperature for 12 hours, the excess alkali is neutralized with 10% HCl. The precipitated material is filtered and washed. Recrystallization from methanol yields 500 mg. of 6-keto-estradiol with a melting point of 285–286° C.

The invention may be variously otherwise embodied within the scope of the appended claims.

What is claimed is:
1. A compound selected from the group consisting of the steroid of the formula

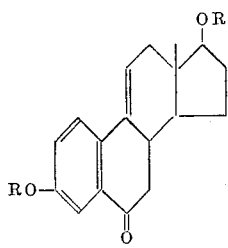

wherein each R is selected from the group consisting of hydrogen and acyl, wherein the acyl radical is of a hydrocarbon carboxylic acid of less than twelve carbon atoms.

2. Δ9(11)-6-keto-estradiol diacetate.

References Cited by the Examiner

UNITED STATES PATENTS 3,130,210    4/1964    Wintersteiner et al. __ 260—397.4

LEWIS GOTTS, *Primary Examiner.*

ELBERT L. ROBERTS, *Assistant Examiner.*